US010742486B2

(12) United States Patent
Mermoud et al.

(10) Patent No.: US 10,742,486 B2
(45) Date of Patent: Aug. 11, 2020

(54) ANALYZING COMMON TRAITS IN A NETWORK ASSURANCE SYSTEM

(71) Applicant: Cisco Technology, Inc., San Jose, CA (US)

(72) Inventors: Grégory Mermoud, Veyras (CH); Abhishek Kumar, Vancouver (CA); Jean-Philippe Vasseur, Saint Martin D'uriage (FR)

(73) Assignee: Cisco Technology, Inc., San Jose, CA (US)

( * ) Notice: Subject to any disclaimer, the term of this patent is extended or adjusted under 35 U.S.C. 154(b) by 229 days.

(21) Appl. No.: 15/864,565

(22) Filed: Jan. 8, 2018

(65) Prior Publication Data

US 2019/0215230 A1    Jul. 11, 2019

(51) Int. Cl.
*H04L 12/24*    (2006.01)
(52) U.S. Cl.
CPC .......... *H04L 41/064* (2013.01); *H04L 41/065* (2013.01); *H04L 41/0631* (2013.01); *H04L 41/0636* (2013.01); *H04L 41/0672* (2013.01); *H04L 41/0677* (2013.01); *H04L 41/0681* (2013.01); *H04L 41/147* (2013.01); *H04L 41/16* (2013.01)
(58) Field of Classification Search
CPC . H04L 41/0636; H04L 41/064; H04L 41/065; H04L 41/0672; H04L 41/0677; H04L 41/0681; G06N 7/005
USPC ........................................................ 709/224
See application file for complete search history.

(56) References Cited

U.S. PATENT DOCUMENTS

| 8,069,370 | B1 | 11/2011 | Li et al. |
| 8,577,330 | B2 | 11/2013 | Reagor |
| 8,737,204 | B2 | 5/2014 | Szabo et al. |
| 9,191,793 | B2* | 11/2015 | Ngo ........................ H04W 4/14 |
| 9,230,061 | B2* | 1/2016 | Ephrat ................... G06Q 50/24 |
| 9,414,247 | B2 | 8/2016 | Huang |
| 9,763,140 | B2* | 9/2017 | McBride ............... H04W 28/24 |
| 10,009,917 | B2* | 6/2018 | Yum .................. H04W 72/1268 |
| 10,209,690 | B2* | 2/2019 | Tannenbaum ........ G06F 16/683 |

(Continued)

OTHER PUBLICATIONS

González, et al., "Root Cause Analysis of Network Failures Using Machine Learning and Summarization Techniques", Network Testing and Analytics, IEEE Communications Magazine—Sep. 2017, vol. 55, Issue: 9, 6 pages, IEEE.

*Primary Examiner* — Tauqir Hussain
(74) *Attorney, Agent, or Firm* — Behmke Innovation Group LLC; Kenneth J. Heywood; Jonathon P. Western

(57) ABSTRACT

In one embodiment, a network assurance system discretizes parameter values of a plurality of time series of measurements obtained from a monitored network by assigning tags to the parameter values. The network assurance system detects occurrences of a particular type of failure event in the monitored network. The network assurance system identifies a set of the assigned tags that frequently co-occur with the occurrences of the particular type of failure event. The network assurance system determines, using a Bayesian framework, rankings for the tags in the identified set based on how well each of the tags acts as a predictor of the failure event. The network assurance system initiates performance of a corrective measure for the failure event based in part on the determined rankings for the tags in the identified set.

20 Claims, 9 Drawing Sheets

(56) References Cited

U.S. PATENT DOCUMENTS

| | | | |
|---|---|---|---|
| 10,262,014 B2* | 4/2019 | Pignataro | G06F 11/142 |
| 10,338,986 B2* | 7/2019 | Grealish | G06F 11/0775 |
| 2006/0246888 A1 | 11/2006 | Bender et al. | |
| 2008/0184075 A1* | 7/2008 | Merriman | G06F 11/3664 |
| | | | 714/38.1 |
| 2015/0227847 A1* | 8/2015 | Noel | G06F 9/542 |
| | | | 706/52 |
| 2016/0162346 A1* | 6/2016 | Kushnir | G06F 11/079 |
| | | | 714/37 |
| 2016/0381580 A1 | 12/2016 | Kwan | |
| 2017/0019291 A1 | 1/2017 | Tapia et al. | |
| 2017/0364819 A1* | 12/2017 | Yang | G06N 7/005 |

\* cited by examiner

ANALYZING COMMON TRAITS IN A NETWORK ASSURANCE SYSTEM

TECHNICAL FIELD

The present disclosure relates generally to computer networks, and, more particularly, to analyzing common traits in a network assurance system.

BACKGROUND

Networks are large-scale distributed systems governed by complex dynamics and very large number of parameters. In general, network assurance involves applying analytics to captured network information, to assess the health of the network. For example, a network assurance system may track and assess metrics such as available bandwidth, packet loss, jitter, and the like, to ensure that the experiences of users of the network are not impinged. However, as networks continue to evolve, so too will the number of applications present in a given network, as well as the number of metrics available from the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
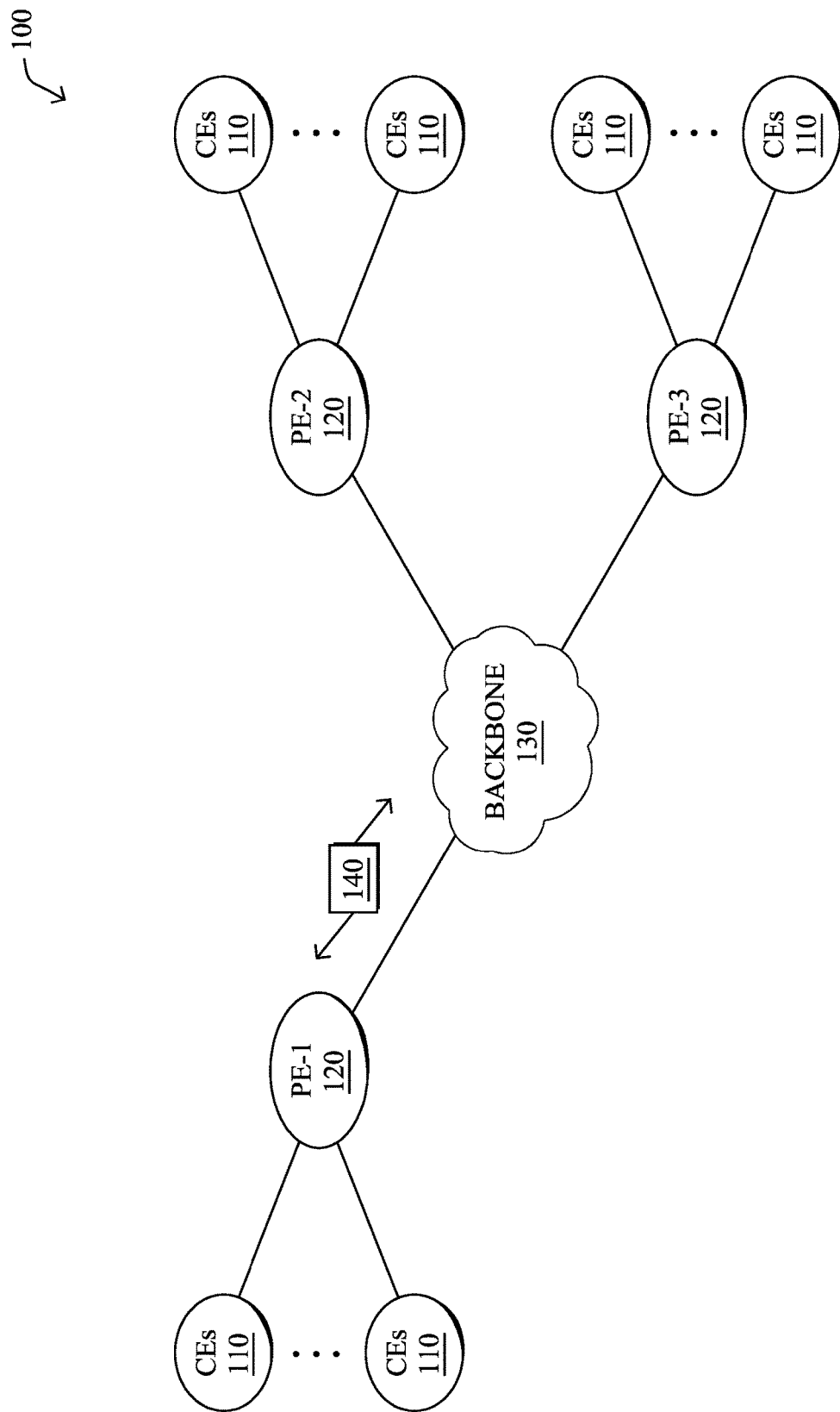
FIGS. 1A-1B illustrate an example communication network.

According to one or more embodiments of the disclosure, a network assurance system discretizes parameter values of a plurality of time series of measurements obtained from a monitored network by assigning tags to the parameter values. The network assurance system detects occurrences of a particular type of failure event in the monitored network. The network assurance system identifies a set of the assigned tags that frequently co-occur with the occurrences of the particular type of failure event. The network assurance system determines, using a Bayesian framework, rankings for the tags in the identified set based on how well each of the tags acts as a predictor of the failure event. The network assurance system initiates performance of a corrective measure for the failure event based in part on the determined rankings for the tags in the identified set.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
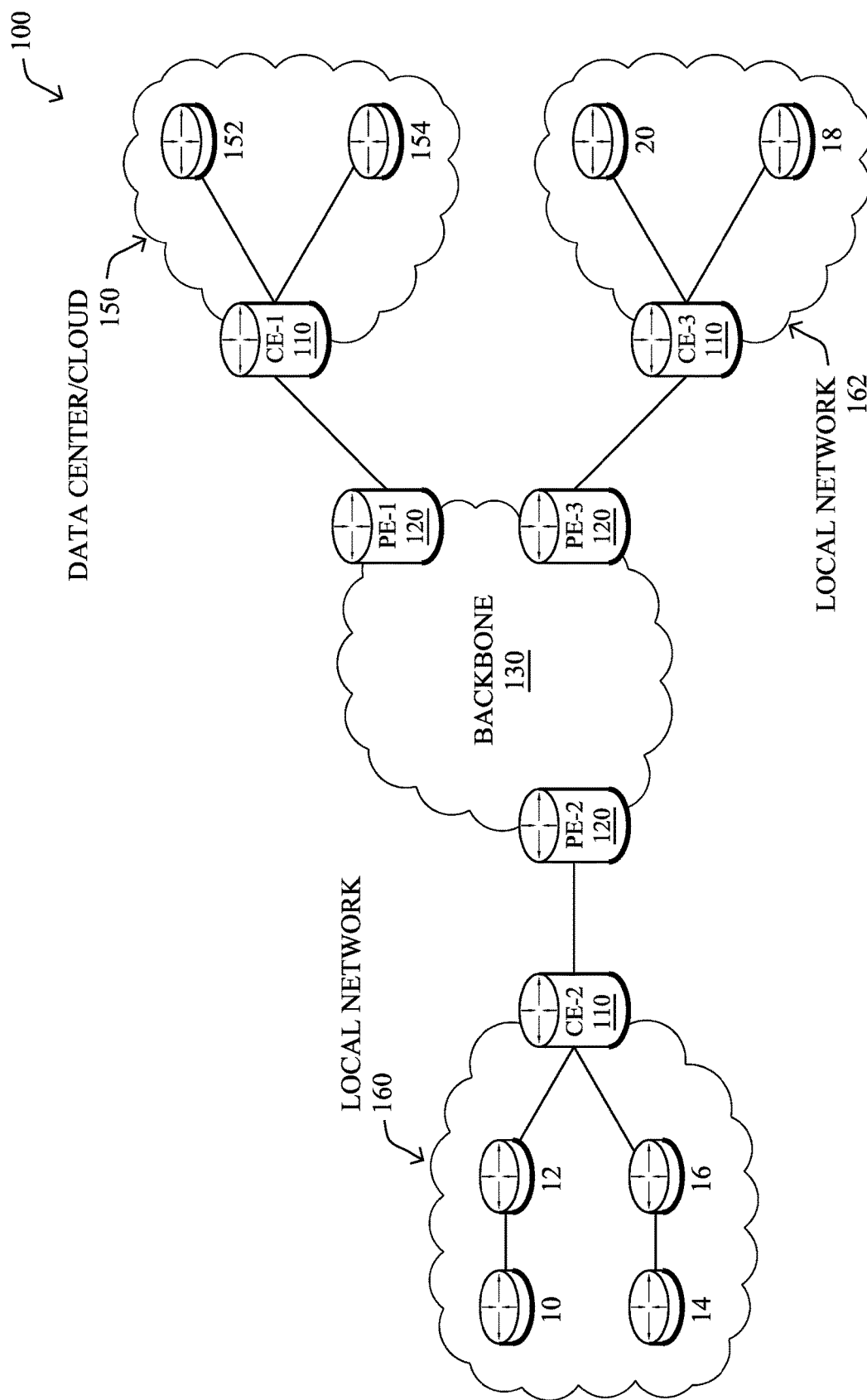

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
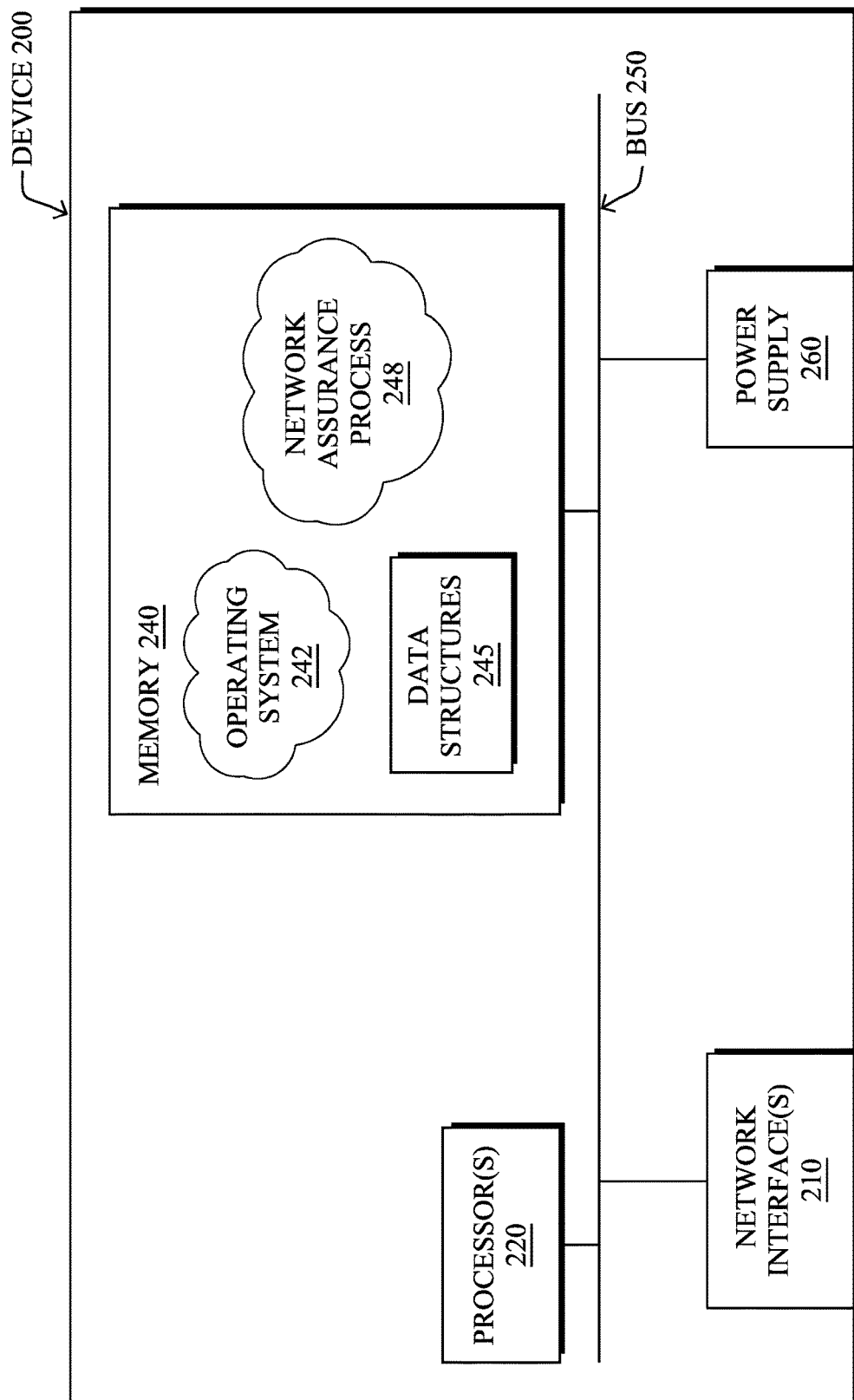
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network assurance process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network assurance process 248 includes computer executable instructions that, when executed by processor(s) 220, cause device 200 to perform network assurance functions as part of a network assurance infrastructure within the network. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

In some embodiments, network assurance process 248 may use any number of predefined health status rules, to enforce policies and to monitor the health of the network, in view of the observed conditions of the network. For example, one rule may be related to maintaining the service usage peak on a weekly and/or daily basis and specify that if the monitored usage variable exceeds more than 10% of the per day peak from the current week AND more than 10% of the last four weekly peaks, an insight alert should be triggered and sent to a user interface.

Another example of a health status rule may involve client transition events in a wireless network. In such cases, whenever there is a failure in any of the transition events, the wireless controller may send a reason code to the assurance system. To evaluate a rule regarding these conditions, the network assurance system may then group 150 failures into different "buckets" (e.g., Association, Authentication, Mobility, DHCP, WebAuth, Configuration, Infra, Delete, De-Authorization) and continue to increment these counters per service set identifier (SSID), while performing averaging every five minutes and hourly. The system may also maintain a client association request count per SSID every five minutes and hourly, as well. To trigger the rule, the system may evaluate whether the error count in any bucket has exceeded 20% of the total client association request count for one hour.

In various embodiments, network assurance process 248 may also utilize machine learning techniques, to enforce policies and to monitor the health of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assurance process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
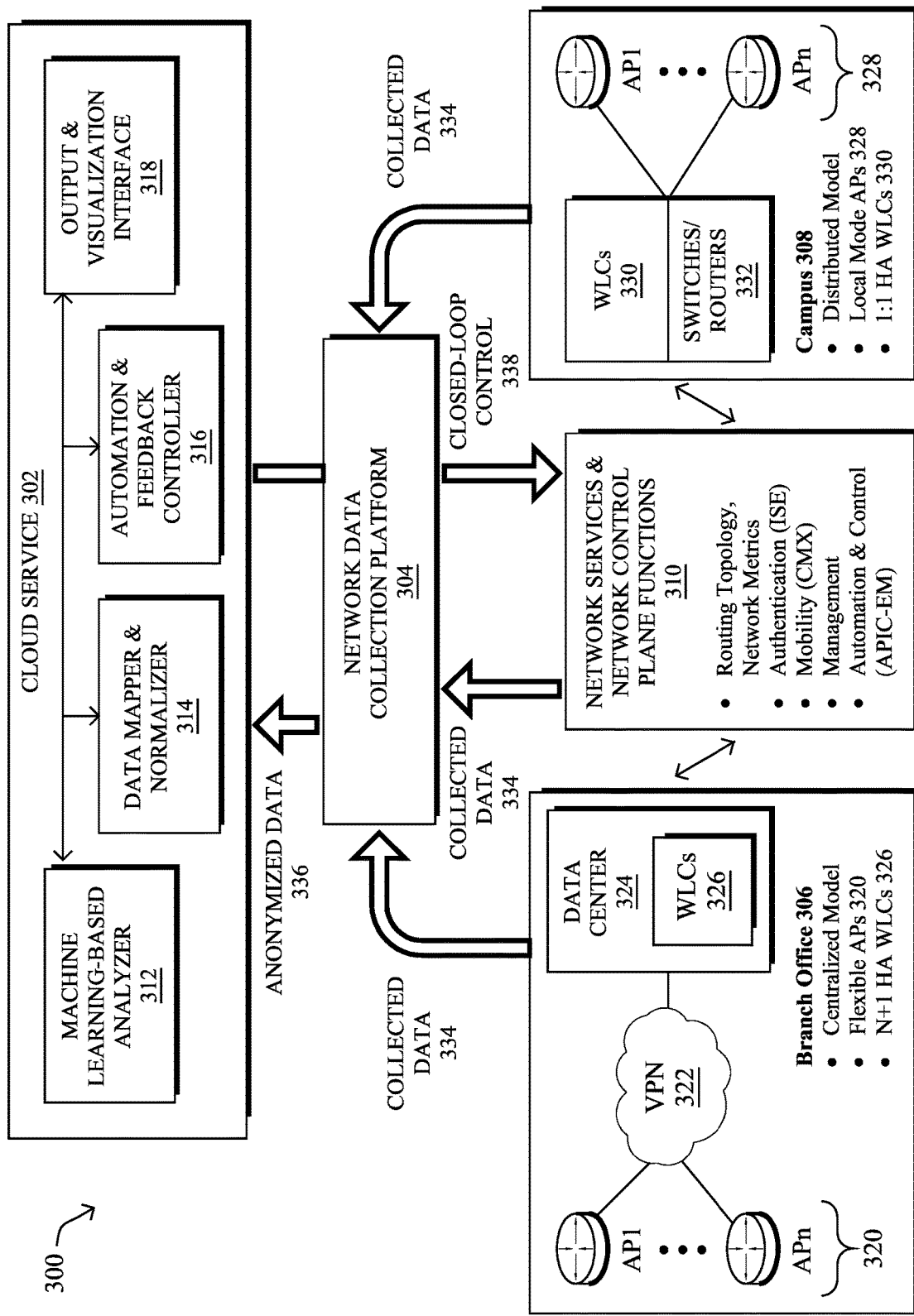
FIG. 3 illustrates an example network assurance system.

FIG. 3 illustrates an example network assurance system 300, according to various embodiments. As shown, at the core of network assurance system 300 may be a cloud service 302 that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired network, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point API through nth access point, APn) through which endpoint nodes may connect. Access points 320 may, in turn, be in communication with any number of wireless LAN controllers (WLCs) 326 (e.g., supervisory devices that provide control over APs) located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point API through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning (ML)-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint client device, networking device in branch office 306 or campus 308, or a network service or control plane function 310, to adjust its operations (e.g., by signaling an endpoint to use a particular AP 320 or 328, etc.).

As noted above, a network assurance system, such as system 300, may collect and assess telemetry data from a monitored network, to assess the health of the monitored network. As networks continue to grow in size, complexity, and usage, the number and types of failure events may also continue to increase. However, hidden relationships between the various conditions of the network may complicate the task of mitigating the failure events. Notably, the interactions of different network devices in the network (e.g., APs, WLCs, etc.) may result in a failure event, even when the individual devices appear to be operating normally.

Analyzing Common Traits in a Network Assurance System

The techniques herein allow for the identification of insights into network failures by a network assurance system, by analyzing common traits of networking devices across the network. In some aspects, networking devices (e.g., radios, APs, routers, switches, etc.) that are impacted by a type of failure event (e.g., low throughput, reboots, anomalous behavior, etc.) may be grouped based on their categorical attributes (e.g., (e.g., status of operation, OS version, the handling of a large number of hosts, etc.). If a given combination of attributes, referred to herein as a "trait," is shared by entities impacted by an issue, performance of corrective measures can be initiated, such as presenting the combination of traits most likely to be associated with the failure event to the administrator as a potential explanation.

Specifically, according to one or more embodiments of the disclosure as described in detail below, a network assurance system discretizes parameter values of a plurality of time series of measurements obtained from a monitored network by assigning tags to the parameter values. The network assurance system detects occurrences of a particular type of failure event in the monitored network. The network assurance system identifies a set of the assigned tags that frequently co-occur with the occurrences of the particular type of failure event. The network assurance system determines, using a Bayesian framework, rankings for the tags in the identified set based on how well each of the tags acts as a predictor of the failure event. The network assurance system initiates performance of a corrective measure for the failure event based in part on the determined rankings for the tags in the identified set.

Illustratively, the techniques described herein may be performed by hardware, software, and/or firmware, such as in accordance with the network assurance process 248, which may include computer executable instructions executed by the processor 220 (or independent processor of interfaces 210) to perform functions relating to the techniques described herein.

Operationally, the techniques herein introduce a mechanism capable of providing data-driven explanations for the reasons behind a network failure, allowing for corrective measures to be taken, such as by automatically changing network settings or allowing a network administrator to implement the change.

According to various embodiments, the techniques herein associate the occurrences of a given type of failure even with the concurrent state of the network. A failure event can take on various forms, e.g., packet failures, radio resets, or a roaming failure. In some embodiments, the network assurance system may derive key insights by considering the state of the network when a failure event occurred, and quantifying the strength of the association between a pattern in the network and the failure event. For example, the system may answer questions such as: "was the interference level unusually high at the time of packet failures, and if so, is there a (statistically significant) mutual dependence between the two?"

In general, the following terminology is used herein to describe the analysis of a failure event by the network assurance system:
  Failure Event: an occurrence of an unusual/unexpected event at a point in time. In many cases, a failure event refers to an event that indicates a decrease in performance of the network and/or an anomalous behavior in the network.
  a categorical label that a parameter takes when its (suitably discretized) value lies beyond a threshold.
  Trait: a pattern of states in network data that co-occurs with an event, usually associated with one or more parameters (attributes of a trait) and their tags (levels of a trait).
  Common trait: a trait that is shared across more than one network gear (e.g. Wireless radio), or occurs frequently in time over many networking gears (e.g. radio).
  Insight: an insight is information about an event that is derived from the associated trait.

Insights are generated by measuring the strength of the co-occurrence of a failure event with the concurrent patterns observed in the network. This allows for the high interpretability of the results, while ensuring statistical rigor in identifying meaningful patterns. High interpretability may be ensured by discretizing time series data into distinct categorical levels that have relevance in a network context. For example, signal-to-noise-ratio (SNR) is a continuous-valued parameter that measures the SNR in the network. By discretizing the SNR measurement time series into categorical levels, such as "high SNR," "medium SNR," and "low SNR" with respect to a threshold, the association rule mining of the techniques herein can detect patterns identifying failure events with "low SNR." This simple discretization approach leads to an insight (in the form of a trait or traits) that is easily interpretable and relevant to the network. In addition, the approach is powerful and easily generalizable to any kind of network events and prevalent state of the network, and can also be customized by the network administrator, to serve up a custom analysis of the network.

Figure 4:
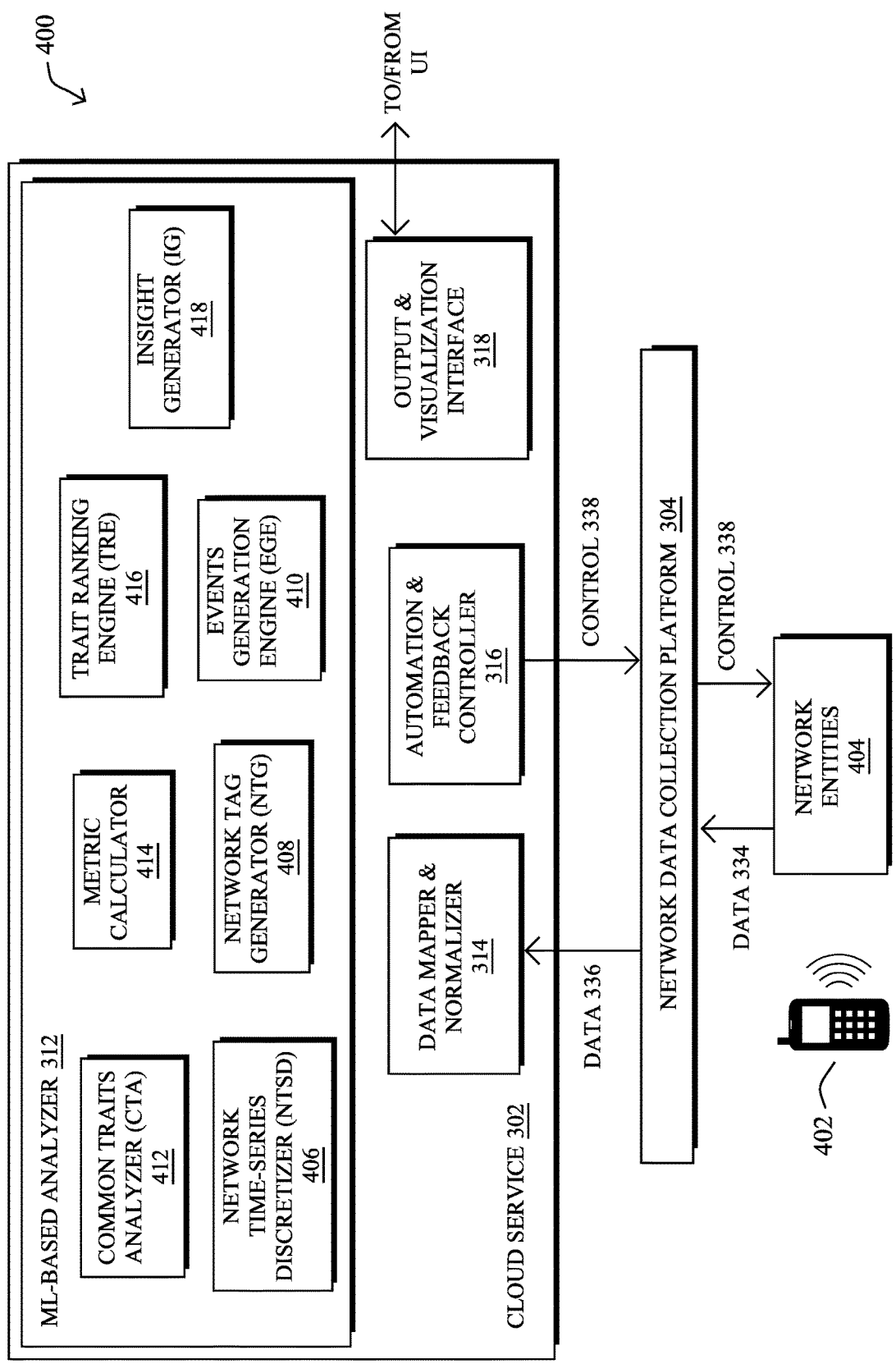
FIG. 4 illustrates an example architecture for analyzing common traits in a network assurance system.

Operationally, FIG. 4 illustrates an example architecture 400 for analyzing common traits in a network assurance system, according to various embodiments. At the core of architecture 400 may be the following components: a network time series discretizer (NTSD) 406, a network tag generator (NTG) 408, an event generation engine (EGE) 410, a common traits analyzer (CTA) 412, a metric calculator, a trait ranking engine (TRE) 416, and/or an insight generator (IG) 418. In some implementations, the components of architecture 400 may be implemented within a network assurance system, such as system 300 shown in FIG. 3. Accordingly, the components 406-418 of architecture 400 shown may be implemented as part of cloud service 302 (e.g., as part of machine learning-based analyzer 312), as part of network data collection platform 304, and/or on one or more network elements/entities 404 that communicate with one or more client devices 402 within the monitored network itself. Further, these components may be implemented in a distributed manner or implemented as its own stand-alone service, either as part of the local network under observation or as a remote service. In addition, the functionalities of the components of architecture 400 may be combined, omitted, or implemented as part of other processes, as desired.

In various embodiments, network time series discretizer (NTSD) 406 may aggregate network measurement data collected by network data collection platform 304 over a fixed time-window. For example, data 334 may include data collected from a wireless controller (e.g., a network entity 404) at a sample rate of every five minutes. During operation, NTSD 406 may discretize this "continuous" stream of measurement data by evaluating the average or most frequent values of the measured parameter in a longer time-window (e.g., a time window of 30 minutes). The time window assessed by NTSD 406 can also be tuned dynamically, in some cases. As a result of its processing, NTSD 406 produces a discretized value for each parameter for each entity (e.g., radio, AP, wireless controller, etc.) on the network.

In various embodiments, network tag generator (NTG) 408 may operate in conjunction with NTSD 406 and perform the dual functions of:
  calculating thresholds on various network parameters, typically based on percentiles of their probability distributions in the data.
  assigning 'tags' or names to parameters that take on discretized values (as obtained from the NTSD) that lie beyond a specified threshold.

The output of NTG 408 is a series of 'tags' or categorical labels to identify the value taken on by a parameter within a given time window. As a result, a continuous numeric time series gets transformed into a discrete time series of categorical levels. For network time series data that is categorical, such as wireless channel number, NTG 408 may either keep all tags or reduce them to more meaningful groups, e.g., channel number 1-39=2.4 GHz frequency, channel number 39-onwards=5 GHz frequency. In another embodiment, such thresholds may be dynamically adjusted according to a rule-based system, user feedback, or other considerations.

Figure 5:
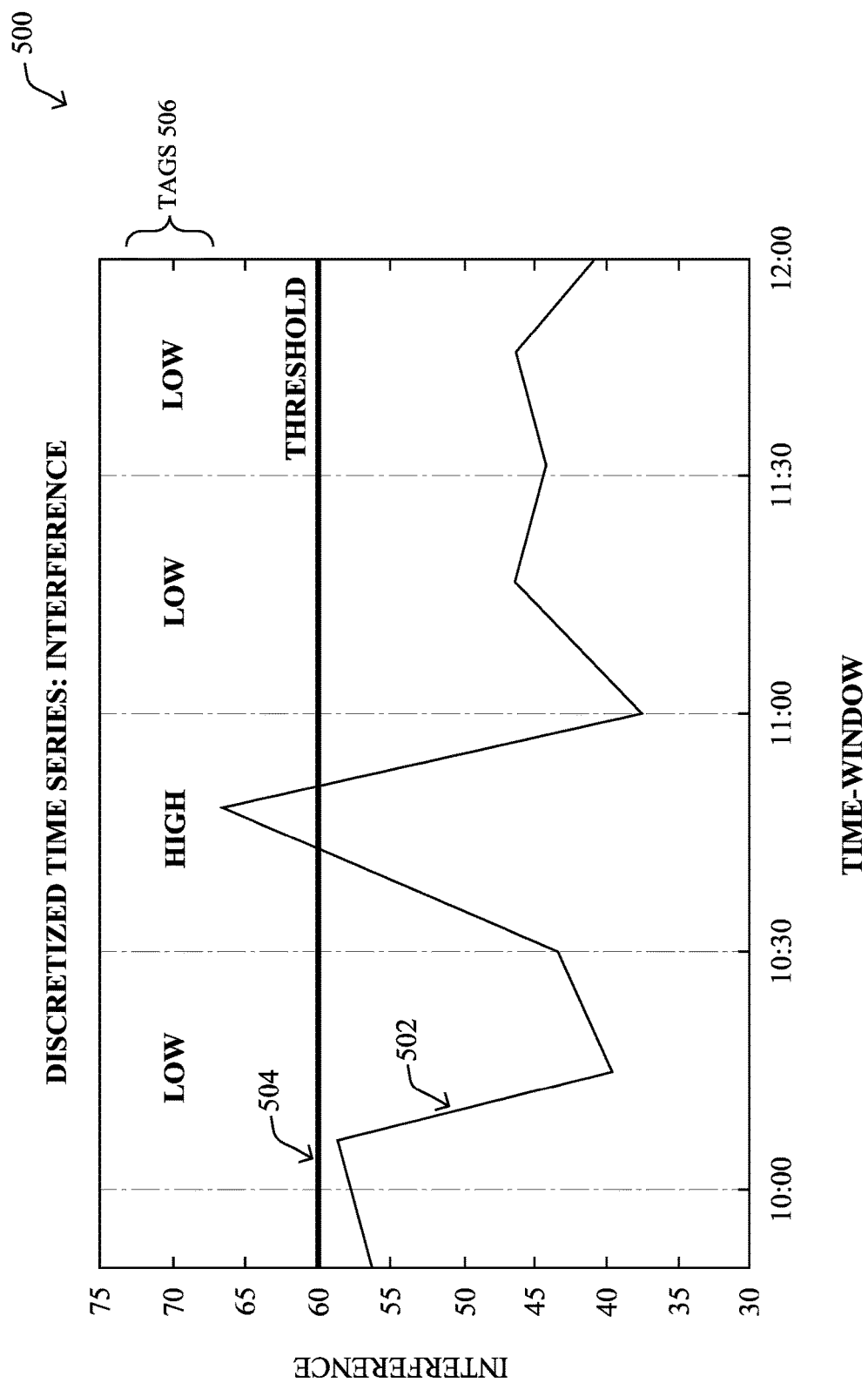
FIG. 5 illustrates an example plot of discretizing a time series of a network measurement.

FIG. 5 illustrates an example plot 500 of discretizing a time series 502 of a network measurement and assigning tags. As shown, assume that the network assurance system monitors wireless interference in the network and that these measurements form the time series 502 in plot 500. Over the course of time, such as between 9:30 AM and 12:00 PM, the parameter values of time series 502 may vary considerably. To discretize time series 502, NTSD 406 may divide time series 502 into different time window, such as the half hour-long increments shown.

After NTSD 406 divides time series 502 into different time windows, NTG 408 may determine whether the interference parameter values of time series 502 for any given time window exceed a defined threshold 504. Based in this comparison, NTG 408 may then assign a tag 506 to the parameter values in that time window. For example, in the time window between 10:00-10:30 AM, the interference parameter values may stay below threshold 504 at all times and, as a result, NTG 408 may assign the "Low" label to this group of interference parameter values. Conversely, since the interference in the 10:30-11:00 AM time window did exceed threshold 504, NTG 408 may assign the "High" label to that group of interference parameter values.

Referring again to FIG. 4, in various embodiments, events generation engine (EGE) 410 may monitor various Key Performance Indicators (KPIs) from the network and generate failure events upon detecting an abnormal regime or pattern related to these KPIs. Such KPIs may include the measurements from the network (e.g., if packet drops exceed a certain level or are deemed anomalous, etc.) and/or quality metrics either reported by the users of the network or computed automatically (e.g., a user-specified rating for a videoconference quality, a call quality metric computed by the system, etc.).

The failure events identified by EGE 410 are central to the analysis since the overall mechanism described herein is designed to group network entities 404 that are impacted by the same type of events. Note that the term "failure event" is used herein to refer to any event in the monitored network in which performance is impacted and a given event does not necessarily require a complete loss of service to be deemed a failure event.

Upon analyzing continuous streams of data from the monitored network, EGE 410 may generate events of various types such as packet failures, radio resets, low throughput, etc. A multitude of sub-routines may be included in EGE 410 to address these different types of events. For example, EGE 410 may perform an explicit calculation of packet failures as a ratio of failures to successful tries to send packets, may apply anomaly detection techniques to identify low throughput by comparing with historical trends, may detect application throughput anomaly detection based on app user behavior, etc.

In various embodiments, common traits analyzer (CTA) 412 may build traits associated with events generated by EGE 410. The events generated by EGE 410 are point-in-time occurrences when a failure event occurs in the network (e.g. packet failures) or when network parameters take on anomalous values (e.g. low throughput anomalies). During execution, CTA 412 may identify the tags applied by NTG 408 and NTSD 406 that are concurrent with failure event occurrences and build "traits" (e.g., patterns of network tags) that are significant in their association with the specific event. Said differently, CTA 412 may identify a set of the assigned tags, also referred to as traits, which frequently co-occur with the occurrences of the particular type of failure event.

To identify common traits of an event, CTA 412 may perform any or all of the following:

- Building transactions: a transaction is a temporal co-occurrence of discretized network data (in the form of tags) with an event. Transactions form the basis on which all associations are built, as they make explicit the relationship between network data and events at the smallest time interval (e.g., 30 minutes in FIG. 2 below).
- Identifying frequently occurring patterns in the transactions: the most frequently occurring tags that are associated with an event are identified as traits. Any known optimization techniques to identify frequently occurring patterns in datasets can be used for this function. For example, in some implementations, CTA 412 may use FP Growth to find the tags that most frequently co-occur with a given event type.
- Identifying common traits: traits that occur on several radios or persist for an extended duration in time are denoted 'common traits' as they are evidenced in several radios/APs or over an extended period of time.

Figure 6:
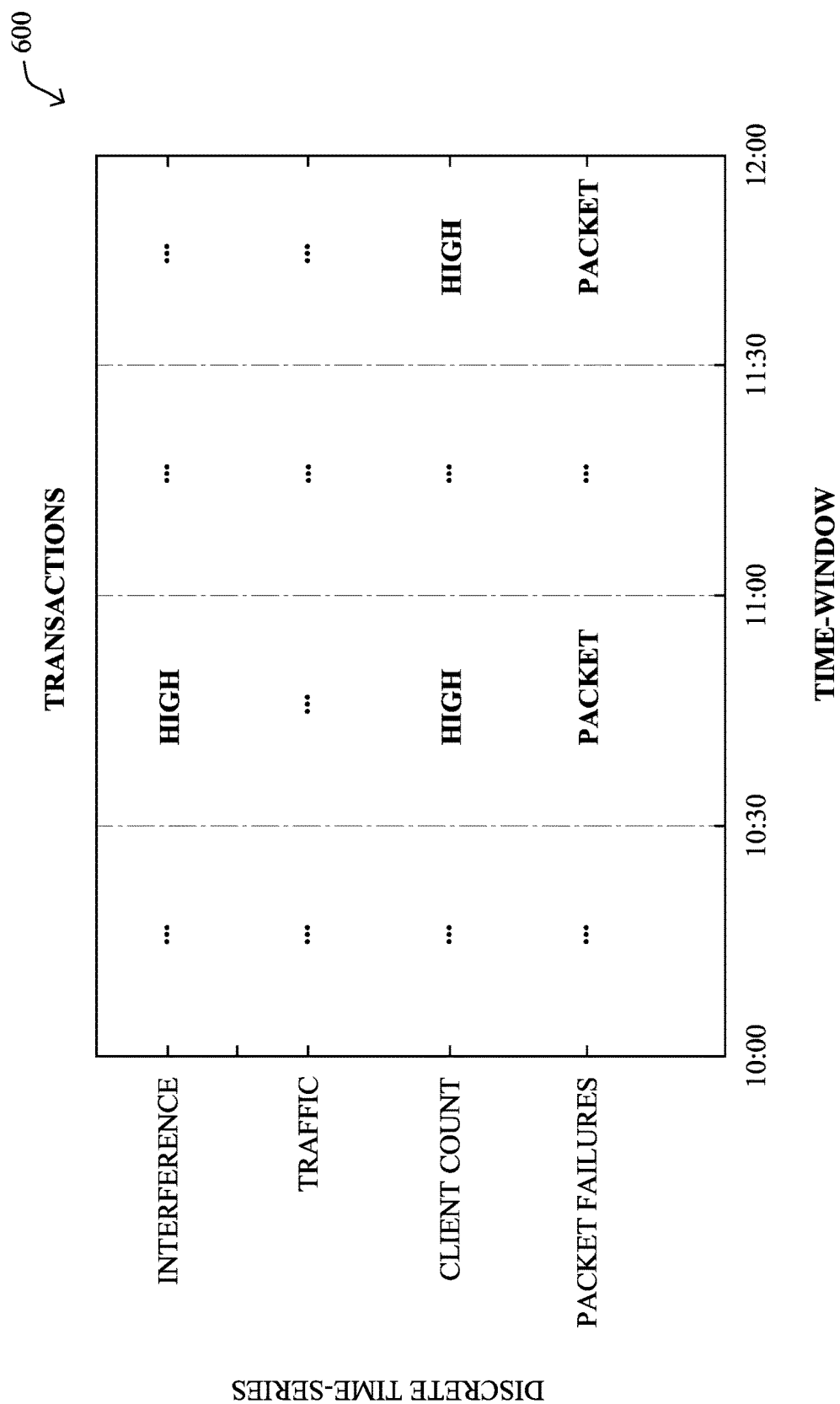
FIG. 6 illustrates an example plot of event traits.

Referring briefly to FIG. 6, an example plot 600 of event traits is shown, according to various embodiments. As shown, assume that four time series are discretized using the above approach and over half-hour long time windows between 10:00 AM and 12:00 AM: 1.) an interference measurement time series, 2.) a traffic volume measurement time series, 3.) a client count measurement time series, and 4.) a time series that tracks packet failure events. From the discretized time series, CTA 412 may construct two sets of transactions: {High Interference+High ClientCount} and {High ClientCount}. The dashes shown in plot 600 indicate that no meaningful tags were generated for the remaining set of data. In other words, when the packet failure events occurred, a high client count co-occurred twice and high interference co-occurred once.

Referring again to FIG. 4, another important aspect of CTA 412 is the versatility of the analyses that can be performed. Analyses can be performed by CTA 412 on a per-radio basis (e.g., to identify issues on specific radios, that may not be prevalent across the network), as well as across all radios on a per-time-interval basis (e.g., an hourly or daily trait analysis on the entire network as a whole). Each slicing of the network data provides an added handle on network activity and provides further insight into understanding the reason behind network failures. These analyses may be further customizable to consider any combination (or subset) of radios. The final results are then synthesized, to take into account the various approaches.

Furthermore, CTA 412 provides highly interpretable results that are directly relevant to the network. By suitably discretizing the time series parameters into network relevant 'tags,' the interpretability of the model is made explicit at the start. CTA 412 leverages the power of association rule mining to find robust patterns in the data, based on the network relevant inputs provided to CTA 412.

It is also worth noting the similarities and differences of the proposed technique with classification models (e.g., tree-based machine learning models) in the context of failure events. In tree-based models, the algorithm performs various splits on features and their values while maximizing a function, such as mutual information or cross entropy, at each node. The end result is a set of features and their split-values, with the features ranked by relative importance with respect to a purity metric, such as the Gini coefficient. These features are the key predictors in the classification of failure event occurrences. The proposed techniques differ from the classification model by making explicit the values on which to split each feature at the start (e.g., the 'tags'). In this way, the techniques are equivalent to a tree-based model where the splits on feature values are pre-defined, and the algorithm essentially provides the relative ranking of features. Furthermore, a tree-based approach provides a single output for the entire dataset (e.g., a set of features that best optimize an objective loss function on the data). The proposed techniques provide multiple models to explain the data, relevant in different regions of the network. For example, there may be multiple sets of features (traits) that best classify the labels (failure events) for different sets of radios in the case of wireless networks. While there are benefits to this approach, a ranking mechanism may also be employed, in some embodiments, to identify the most significant traits as predictors. The trait ranking engine (TRE) 416 is discussed in detail below.

In addition, the techniques herein differ from classification-based approaches in the context of classification decision boundaries. The decision boundary in the proposed techniques herein is more linear than the tree-based models due to the discrete set of 'tags' that each parameter takes on. As a result, the feature space can only be split on a limited set of 'tags', as compared to the continuous set of values available to an alternative classification approach. In other words, a less non-linear decision boundary is traded for a more interpretable set of results for the end user. That being said, the proposed techniques provide results specific to different sub-regions of the dataset, as compared to a single model obtained from a tree-based classification approach.

In various embodiments, metric calculator 414 may quantify the degree of association between events and traits in a statistically rigorous manner. The co-occurrence of traits and events can be formulated in the language of a trait being a good "predictor" of an event. In other words, the presence of a trait "predicts" the occurrence of an event, while the absence of a trait indicates the absence of an event. To do so, in some implementations, the co-occurrence of traits and events can be quantified using a confusion matrix and metrics such as lift, conviction, or the like, can be used to characterize the strength of association between the traits and the events. As a result, traits that have high precision and high recall become good "predictors" of an event.

According to various embodiments, trait ranking engine (TRE) 416 is responsible for incorporating the resultant traits and metrics, obtained from CTA 412 and metric calculator 414, and ranking them in a systematic manner in terms of their relative importance. In some embodiments, TRE 416 may utilize a Bayesian framework, to rank the event traits. Generally, a Bayesian analysis of parameter estimation has three components: (i.) the prior distribution of the parameter, based on previously held beliefs about its behavior, (ii.) the likelihood of the data given the parameter, (iii.) the posterior distribution of the parameter, updated with the observed data.

By definition, precision refers to the ratio of true positives the sum of true and false positives. As a "predictor" of an event, the precision of a trait denotes the rate at which an event occurs in its presence. Said differently, a high precision translates into the trait being a strong predictor of an event. As a result, ranking traits by their precision is a preferred way of finding the most important traits on the network. However, a point-estimate analysis of precision is not reliable, since it does not include the impact of the relative number of true positives and false positives for different traits.

Consider Table 1 below, where Traits A and B have the same precision, but vastly different occurrences on the network. Trait A occurs very rarely compared to Trait B. As a result, it is not clear which trait will be a better predictor on the network in the future, as a small change in either the True Positives or False Positives for Trait A will modify its precision by a large margin, relative to Trait B.

TABLE 1

| Trait | True Positives | False Positives | Precision |
|-------|----------------|-----------------|-----------|
| Trait A | 80 | 20 | 0.8 |
| Trait B | 800 | 200 | 0.8 |

TRE 416 may implement a ranking system using Bayesian analysis, by quantifying the above uncertainty. More specifically, the presence or absence of a trait (and hence event occurrence, since a trait is a predictor of an event), can be modelled using a Binomial distribution Bin(k, n, p), where 'k' represents the number of successes (or true positives), 'n' represents the total number of observations and 'p' represents the probability of 'k' successes out of 'n' events. This is simply the definition of precision for a trait. In addition, 'n-k' is the number of failures (false positives). For a Binomial distribution, the conjugate prior distribution for 'p' is given by a Beta distribution. More formally, p~Beta (a, b), where the Beta distribution is parameterized by two parameters: 'a' and 'b'. As a result, the distribution for precision is given by a Beta distribution in this framework.

The Bayesian analysis for precision of a trait by TRE 416 will have three components: prior distribution, likelihood, posterior distribution. The prior distribution is based on prior beliefs about the precision of that trait. A meaningful prior that is considered is the empirical Bayes prior. Here, the prior distribution for a trait is obtained by fitting a Beta distribution to the precision of all traits i.e. prior probability (p)=Beta(a0, b0), where a0 and b0 are obtained by fitting to the distribution of precision for all traits. The likelihood is obtained by looking at the observed data, i.e., the number of true positives and false positives for each trait. Finally, the posterior distribution is obtained by updating the prior distribution with the observed data. Mathematically, this results in a simple formula for the posterior distribution for precision:

posterior probability($p$)=Beta($a0$+true positives,$b0$+ false positives).

As a result, obtaining the posterior probability distribution for precision for each trait is simply a matter of updating the best-fit values a0, b0 with the observed number of true positives and false positives.

Figure 7:
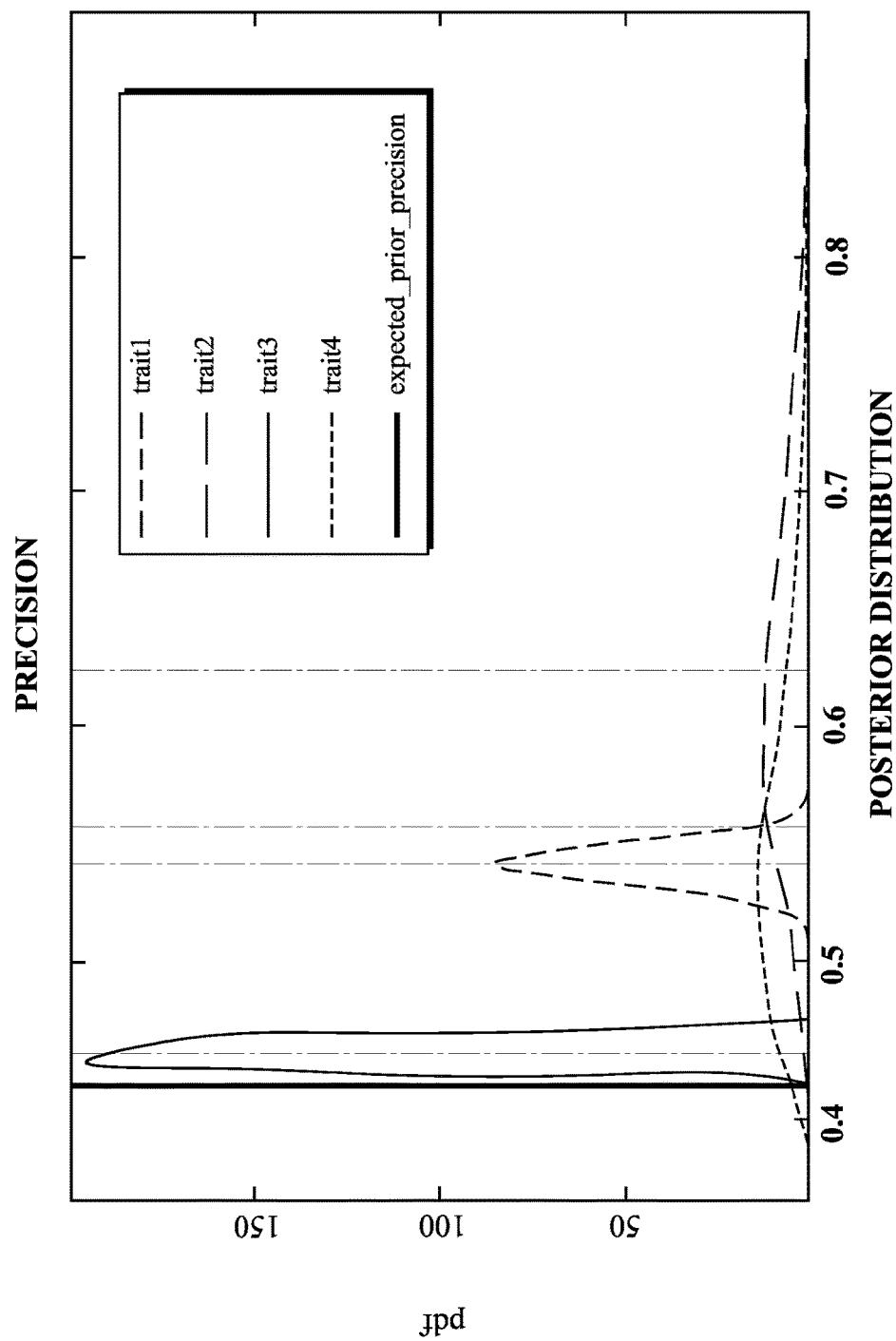
FIG. 7 illustrates an example plot of precision curves for different event traits.

The last step in the analysis by TRE 416 is the relative ranking of these distributions, an example of which is shown in plot 700 in FIG. 7. As shown, traits are ranking in increasing order of the probability of each trait's precision distribution being larger than the expected prior probability. In this way, the uncertainty in the distribution is factored in the ranking. For the example shown, the traits are ranked in the order: trait 1>trait 3>trait 2>trait 4. This is different from the ordering that would be obtained if only the point-estimate of precision (dotted lines) would have been considered. Although trait 2 has a much higher precision, the uncertainty, due to a smaller set of true positives and false positives for trait 2, does not make it as reliable an indicator as trait 1.

Referring again to FIG. 4, insight generator (IG) 418 may synthesize suitably ranked traits from TRE 416 into natural language sentences, to provide the end user with meaningful and quantifiable insights. In turn, these insights can be provided to a user interface (UI) via output and visualization interface 318. For example, the following traits may be generated for radio reset failure events:

TABLE 2

| Trait | # of radios | # of events | Total TP | Lift | Convict. | Precision | Recall | FPR | Loc. Pred. Val. | Global Pred. Value |
|---|---|---|---|---|---|---|---|---|---|---|
| A | 3 | 62 | 37 | 3.19 | 1.99 | 0.011 | 0.6 | 0.21 | 1.46 | 2.12 |
| B | 40 | 749 | 527 | 2.16 | 2.57 | 0.0074 | 0.72 | 0.36 | 1.17 | 1.42 |
| C | 40 | 749 | 529 | 2.16 | 2.58 | 0.0074 | 0.72 | 0.36 | 1.17 | 1.42 |
| D | 5 | 117 | 70 | 1.96 | 1.96 | 0.0109 | 0.61 | 0.32 | 1.24 | 2.1 | whereby traits A-D are as follows:

TABLE 3

| Trait | Tags |
|---|---|
| A | {"apGroup": "UBCV", "channel": "149", "clientCount": "hi", "event": "Radio reset"} |
| B | {"clientCount": "hi", "event": "Radio reset"} |
| C | {"apGroup": "UBCV", {"clientCount": "hi", "event": "Radio reset"} |
| D | {"apGroup": "UBCV", "clientCount": "hi", "event": "R", "location": "default_location"} |

From the above values, IG 418 may convert these traits into natural language insights that can be used to notify a network administrator and/or initiate automatic corrections in the monitored network. For example, IG 418 may generate the following insights based on the data in Tables 2-3 above:

"3 radios were found to be twice as likely to have radio resets when they experienced high client count on the 5 GHz (channel=149) band in the UBCV apGroup, compared to the rest of the network."

"40 radios are 42% more likely to experience radio resets than other radios in the network when they have high client counts. These radios accounted for 749/1807 (or 40%) of the total radio reset occurrences on the network. More than 70% of these occurrences were related to high client count."

"The same 40 radios were part of the UBCV apGroup. On these radios, high client count was the most likely indicator of a radio reset, corresponding to a 17% increase in radio resets compared to any other consistent factor observed on those radios."

"5 radios, located in the default location, and in the UBCV apGroup, were found to experience a 24% increase in radio resets in the presence of high client count."

Figure 8:
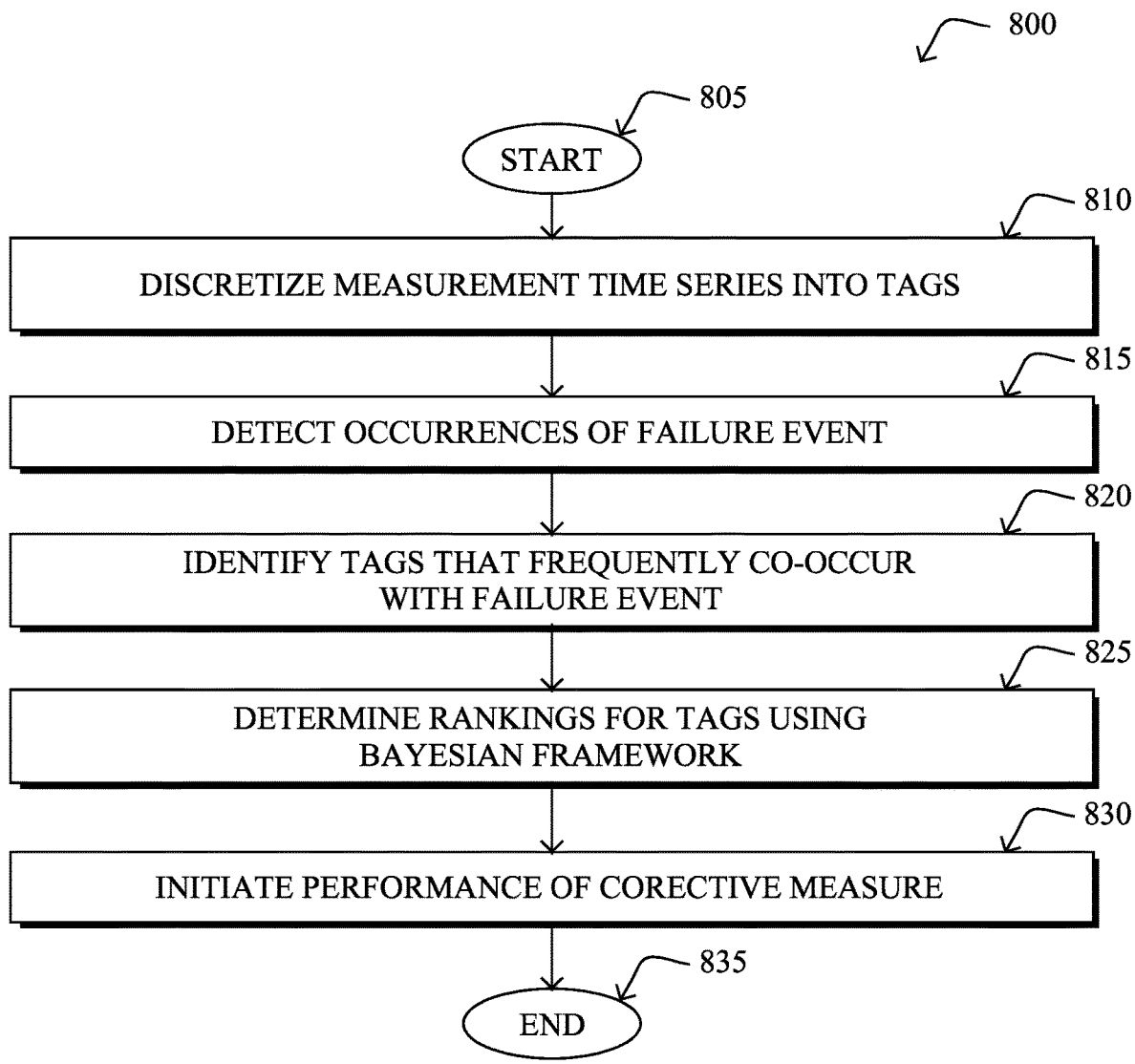
FIG. 8 illustrates an example simplified procedure for analyzing common traits in a network assurance system.

FIG. 8 illustrates an example simplified procedure for analyzing common traits in a network assurance system, in a network in accordance with one or more embodiments described herein. For example, a non-generic, specifically configured device (e.g., device 200) may perform procedure 800 by executing stored instructions (e.g., process 248), to implement a network assurance system. The procedure 800 may start at step 805, and continues to step 810, where, as described in greater detail above, the system may discretize parameter values of a plurality of time series of measurements obtained from a monitored network by assigning tags to the parameter values. For example, as detailed above, the network assurance service may determine whether the measurement parameter values within a given time window exceed a defined threshold and, based on this determination, apply a tag to the parameter values for that time window.

At step 815, as detailed above, the network assurance system may detect occurrences of a particular type of failure event in the monitored network. In some embodiments, the system may monitor various KPIs in the network, to determine whether a failure event has occurred. In some embodiments, the network assurance system may apply anomaly detection to one or more KPIs, to determine that a failure event has occurred.

At step 820, the network assurance system may identify a set of the assigned tags that frequently co-occur with the occurrences of the particular type of failure event, as described in greater detail above. Notably, the system may find the 'traits' of the event that describe the network measurements from the network at the time of the event.

At step 825, as detailed above, the network assurance system may determine, using a Bayesian framework, rankings for the tags in the identified set based on how well each of the tags acts as a predictor of the failure event. In various embodiments, the system may do so by calculating a prior distribution, likelihood, and posterior distribution of a precision of each of the tags in the identified set, whereby the precision represents a rate of co-occurrence of the tag with the type of failure event.

At step 830, the network assurance system may initiate performance of a corrective measure for the failure event based in part on the determined rankings for the tags in the identified set, as described in greater detail above. In various embodiments, this may entail sending a natural language-based insight that comprises the highest ranked tags in the set to a user interface for review by a network administrator. Such an insight may be in sentence form, in some cases, thereby allowing the administrator to easily assess the potential causes of the failure event and make changes to the network, as needed. Procedure 800 then ends at step 835.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the generation of insights into the occurrences of failure events in a monitored network. In some aspects, measurements from the network may be discretized by assigning tags to the measurement parameter values and, in turn, identifying the set of tags that frequently co-occur with the event.

While there have been shown and described illustrative embodiments that provide for insight analysis in a network assurance system, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, such as BGP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   detecting, by a security device in a computer network, potential domain generation algorithm (DGA) searching activity using a domain name service (DNS) model to detect abnormally high DNS requests made by a host attempting to locate a command and control (C&C) server in the computer network based on at least encryption traffic analysis (ETA) data;
   detecting, by the security device, potential DGA communications activity based on applying a hostname-based classifier for DGA domains associated with any server internet protocol (IP) address in a data stream from the host;
   correlating, by the security device, the potential DGA searching activity with the potential DGA communications activity, wherein the DNS model is correlated with the hostname-based classifier to identify DGA performing malware; and
   identifying, by the security device, the DGA performing malware based on the correlating.

2. The method as in claim 1, further comprising:
   training a first model for the detecting potential DGA searching activity and a second model for the detecting potential DGA communications activity for individual detection improvement based on the correlating and identifying.

3. The method as in claim 2, wherein the training comprises:
   adjusting false positive thresholds of one or both of the first model and a second model.

4. The method as in claim 1, further comprising:
   refining the identifying by further correlating with proxy-log-classifier-based DGA detection.

5. The method as in claim 1, further comprising:
   performing DGA mitigation in response to identifying DGA performing malware.

6. The method as in claim 5, wherein the DGA mitigation comprises blocking traffic related to the malware.

7. The method as in claim 5, wherein the DGA mitigation comprises alerting an administrator to the malware.

8. The method as in claim 1, further comprising:
   creating a timeline of detection events based on the potential DGA searching activity and the potential DGA communications activity.

9. The method as in claim 1, wherein the detecting the potential DGA searching activity is based on network flow data.

10. The method as in claim 1, wherein the detecting potential DGA communications activity is based on one or more of network flow data, encrypted traffic analysis (ETA) data, DNS data, server name indication (SNI) field in hypertext transfer protocol (HTTP) messages, HTTP proxy logs, hostnames, uniform resource locators (URLs), and user agent information in HTTP messages.

11. The method as in claim 1, wherein the detecting potential DGA communications activity uses passive DNS mapping without querying external databases.

12. The method as in claim 11, wherein passive DNS mapping is based on building passive DNS maps on-the-fly using one or both of proxy logs and the ETA data.

13. The method as in claim 1, wherein the detecting potential DGA searching activity comprises:
    receiving network flow information from one or more other computing devices that are configured as observation points, and based upon the network flow information, determining a number of domain name server requests originating from a particular host among a plurality of hosts, wherein the domain name server requests are directed to one or more domain name servers;
    determining a number of internet protocol addresses contacted by the particular host; and
    determining that malware potentially exists on the particular host based on the number of domain name server requests and the number of internet protocol addresses contacted.

14. The method as in claim 1, wherein the detecting potential DGA communications activity comprises:
    obtaining a plurality of sample domain names and labeling each of the plurality of sample domain names as a DGA domain, a non-DGA domain, or a suspicious domain;
    training a classifier in a first stage based on the plurality of sample domain names;
    obtaining a plurality of sample proxy logs including proxy logs of DGA domains and proxy logs of non-DGA domains;
    training the classifier in a second stage based on the plurality of sample domain names and the plurality of sample proxy logs;
    obtaining a plurality of live traffic proxy logs;
    testing the classifier by classifying the plurality of live traffic proxy logs as DGA proxy logs; and
    identifying network communication as potential malware network communication with DGA domains based on a trained and tested classifier.

15. An apparatus, comprising:
    one or more network interfaces to communicate with a computer network;
    a processor coupled to the network interfaces and configured to execute one or more process; and
    a memory configured to store a process executable by the processor, the process when executed configured to:
       detect potential domain generation algorithm (DGA) searching activity using a domain name service (DNS) model to detect abnormally high DNS requests made by a host attempting to locate a command and control (C&C) server in the computer network based on at least encryption traffic analysis (ETA) data;

detect potential DGA communications activity based on applying a hostname-based classifier for DGA domains associated with any server internet protocol (IP) address in a data stream from the host;

correlate the potential DGA searching activity with the potential DGA communications activity, wherein the DNS model is correlated with the hostname-based classifier to identify DGA performing malware; and identify the DGA performing malware based on the correlating.

16. The apparatus as in claim 15, wherein the process, when executed, is further configured to:

train a first model for the detecting potential DGA searching activity and a second model for the detecting potential DGA communications activity for individual detection improvement based on the correlating and identifying.

17. The apparatus as in claim 15, wherein the process, when executed, is further configured to:

refine the identifying by further correlating with proxy-log-classifier-based DGA detection.

18. The apparatus as in claim 15, wherein the process, when executed, is further configured to:

perform DGA mitigation in response to identifying DGA performing malware.

19. A tangible, non-transitory, computer-readable medium storing program instructions that cause a computer to execute a process, comprising:

detecting potential domain generation algorithm (DGA) searching activity using a domain name service (DNS) model to detect abnormally high DNS requests made by a host attempting to locate a command and control (C&C) server in a computer network based on at least encryption traffic analysis (ETA) data;

detecting potential DGA communications activity based on applying a hostname-based classifier for DGA domains associated with any server internet protocol (IP) address in a data stream from the host;

correlating the potential DGA searching activity with the potential DGA communications activity, wherein the DNS model is correlated with the hostname-based classifier to identify DGA performing malware; and identifying the DGA performing malware based on the correlating.

20. The computer-readable medium as in claim 19, wherein the process further comprises:

training a first model for the detecting potential DGA searching activity and a second model for the detecting potential DGA communications activity for individual detection improvement based on the correlating and identifying.

* * * * *

UNITED STATES PATENT AND TRADEMARK OFFICE
CERTIFICATE OF CORRECTION

PATENT NO. : 10,742,486 B2
APPLICATION NO. : 15/864565
DATED : August 11, 2020
INVENTOR(S) : Grégory Mermoud It is certified that error appears in the above-identified patent and that said Letters Patent is hereby corrected as shown below:

In the Specification

Column 6, Line 6, please amend as shown:
wireless controller may send a reason_code to the assurance Column 7, Line 43, please amend as shown:
AP1 through nth access point, APn) through which endpoint Column 7, Line 58, please amend as shown:
AP1 through nth access point APm) that provide connective- Column 11, Line 42, please amend as shown:
Tag: a categorical label that a parameter takes when its (suit In the Claims Column 19, Line 24, Claims 1-20 should read as follows:
1. A method comprising:
　　discretizing, by a network assurance system, parameter values of a plurality of time series of measurements obtained from a monitored network by assigning tags to the parameter values;
　　detecting, by the network assurance system, occurrences of a particular type of failure event in the monitored network;
　　identifying, by the network assurance system, a set of the assigned tags that frequently co-occur with the occurrences of the particular type of failure event;
　　determining, by the network assurance system and using a Bayesian framework, rankings for the tags in the identified set based on how effective each of the tags are at acting as a predictor of the failure event; and
　　initiating, by the network assurance system, performance of a corrective measure for the failure event based in part on the determined rankings for the tags in the identified set.

Signed and Sealed this
Sixteenth Day of February, 2021

Drew Hirshfeld
*Performing the Functions and Duties of the
Under Secretary of Commerce for Intellectual Property and
Director of the United States Patent and Trademark Office*

2. The method as in claim 1, wherein detecting the occurrences of the particular type of failure event in the monitored network comprises:
  monitoring, by the network assurance system, one or more key performance indicators (KPIs) from the network; and
  applying, by the network assurance system, anomaly detection to the one or more KPIs, wherein the occurrences of the particular type of failure event correspond to detected anomalies in the one or more KPIs.

3. The method as in claim 1, wherein discretizing the parameter values of the plurality of time series of measurements obtained from the monitored network by assigning tags to the parameter values comprises:
  determining, for a predefined time window, whether the parameter value of a particular time series exceeds a threshold; and
  assigning a tag to the parameter value based on whether the parameter value exceeded the threshold during the predefined time window.

4. The method as in claim 1, wherein at least one tag is indicative of a wireless channel or wireless frequency used in the monitored network.

5. The method as in claim 1, wherein determining, using a Bayesian framework, rankings for the tags in the identified set comprises:
  calculating a prior distribution, likelihood, and posterior distribution of a precision of each of the tags in the identified set, wherein the precision represents a rate of co-occurrence of the tag with the type of failure event.

6. The method as in claim 1, wherein the measurements obtained from a monitored network comprise one or more of: wireless interference, dropped packets, traffic volume, or endpoint client count in the network.

7. The method as in claim 1, wherein initiating performance of a corrective measure for the failure event based in part on the determined rankings for the tags in the identified set comprises:
  sending, by the network assurance system, a text-based alert that comprises one or more top-ranked tags in the identified set.

8. An apparatus, comprising:
  one or more network interfaces to communicate with a network that comprises a plurality of sensors and actuators;
  a processor coupled to the network interfaces and configured to execute one or more processes; and
  a memory configured to store a process executable by the processor, the process when executed configured to:
    discretize parameter values of a plurality of time series of measurements obtained from a monitored network by assigning tags to the parameter values;
    detect occurrences of a particular type of failure event in the monitored network;
    identify a set of the assigned tags that frequently co-occur with the occurrences of the particular type of failure event;

determine, using a Bayesian framework, rankings for the tags in the identified set based on how effective each of the tags are at acting as a predictor of the failure event; and
initiate performance of a corrective measure for the failure event based in part on the determined rankings for the tags in the identified set.

9. The apparatus as in claim 8, wherein the apparatus detects the occurrences of the particular type of failure event in the monitored network by:
monitoring one or more key performance indicators (KPIs) from the network; and
applying anomaly detection to the one or more KPIs, wherein the occurrences of the particular type of failure event correspond to detected anomalies in the one or more KPIs.

10. The apparatus as in claim 8, wherein the apparatus discretizes the parameter values of the plurality of time series of measurements obtained from the monitored network by assigning tags to the parameter values by:
determining, for a predefined time window, whether the parameter value of a particular time series exceeds a threshold; and
assigning a tag to the parameter value based on whether the parameter value exceeded the threshold during the predefined time window.

11. The apparatus as in claim 8, wherein at least one tag is indicative of a wireless channel or wireless frequency used in the monitored network.

12. The apparatus as in claim 8, wherein the apparatus determines, using a Bayesian framework, rankings for the tags in the identified set by:
calculating a prior distribution, likelihood, and posterior distribution of a precision of each of the tags in the identified set, wherein the precision represents a rate of co-occurrence of the tag with the type of failure event.

13. The apparatus as in claim 8, wherein the measurements obtained from a monitored network comprise one or more of: wireless interference, dropped packets, traffic volume, or endpoint client count in the network.

14. The apparatus as in claim 8, wherein the apparatus initiates performance of a corrective measure for the failure event based in part on the determined rankings for the tags in the identified set by:
sending text-based alert that comprises one or more top-ranked tags in the identified set.

15. A tangible, non-transitory, computer-readable medium storing program instructions that cause a network assurance system to execute a process comprising:
discretizing, by the network assurance system, parameter values of a plurality of time series of measurements obtained from a monitored network by assigning tags to the parameter values;
detecting, by the network assurance system, occurrences of a particular type of failure event in the monitored network;
identifying, by the network assurance system, a set of the assigned tags that frequently co-occur with the occurrences of the particular type of failure event;

determining, by the network assurance system and using a Bayesian framework, rankings for the tags in the identified set based on how effective each of the tags are at acting as a predictor of the failure event; and initiating, by the network assurance system, performance of a corrective measure for the failure event based in part on the determined rankings for the tags in the identified set.

16. The computer-readable medium as in claim 15, wherein detecting the occurrences of the particular type of failure event in the monitored network comprises:

monitoring, by the network assurance system, one or more key performance indicators (KPIs) from the network; and applying, by the network assurance system, anomaly detection to the one or more KPIs, wherein the occurrences of the particular type of failure event correspond to detected anomalies in the one or more KPIs.

17. The computer-readable medium as in claim 15, wherein discretizing the parameter values of the plurality of time series of measurements obtained from the monitored network by assigning tags to the parameter values comprises:

determining, for a predefined time window, whether the parameter value of a particular time series exceeds a threshold; and assigning a tag to the parameter value based on whether the parameter value exceeded the threshold during the predefined time window.

18. The computer-readable medium as in claim 15, wherein at least one tag is indicative of a wireless channel or wireless frequency used in the monitored network.

19. The computer-readable medium as in claim 15, wherein determining, using a Bayesian framework, rankings for the tags in the identified set comprises:

calculating a prior distribution, likelihood, and posterior distribution of a precision of each of the tags in the identified set, wherein the precision represents a rate of co-occurrence of the tag with the type of failure event.

20. The computer-readable medium as in claim 15, wherein the measurements obtained from a monitored network comprise one or more of: wireless interference, dropped packets, traffic volume, or endpoint client count in the network.